United States Patent [19]
McCalley et al.

[11] Patent Number: 5,982,894
[45] Date of Patent: Nov. 9, 1999

[54] SYSTEM INCLUDING SEPARABLE PROTECTED COMPONENTS AND ASSOCIATED METHODS

[75] Inventors: Karl W. McCalley, Indian Harbor Beach; John C. Schmitt, Indialantic, both of Fla.

[73] Assignee: AuthenTec, Inc., Melbourne, Fla.

[21] Appl. No.: 08/796,161

[22] Filed: Feb. 6, 1997

[51] Int. Cl.[6] .................................................. H04L 9/00
[52] U.S. Cl. ........................................ 380/9; 340/825.31
[58] Field of Search ................................. 380/9, 25, 49, 380/23; 340/825.31, 825.34

[56] References Cited

U.S. PATENT DOCUMENTS

| | | | |
|---|---|---|---|
| Re. 31,864 | 4/1985 | van Bavel et al. | 371/20 |
| 4,183,461 | 1/1980 | Sato | 235/304 |
| 4,453,210 | 6/1984 | Suzuki et al. | 364/200 |
| 4,494,114 | 1/1985 | Kaish | 340/825.31 |
| 4,999,621 | 3/1991 | Loeb | 340/825.34 |
| 5,006,843 | 4/1991 | Hauer | 340/825.31 |
| 5,091,724 | 2/1992 | Go | 340/825.56 |
| 5,111,185 | 5/1992 | Kozaki | 340/568 |
| 5,202,997 | 4/1993 | Arato | 395/725 |
| 5,229,648 | 7/1993 | Sues et al. | 307/10.2 |
| 5,245,330 | 9/1993 | Wassink | 340/825.34 |
| 5,311,450 | 5/1994 | Ojima | 364/550 |
| 5,313,639 | 5/1994 | Chao | 395/725 |
| 5,349,326 | 9/1994 | Yamada | 340/426 |
| 5,406,261 | 4/1995 | Glenn | 340/571 |
| 5,418,519 | 5/1995 | Hino et al. | 340/426 |
| 5,473,200 | 12/1995 | Woo | 307/10.2 |
| 5,479,612 | 12/1995 | Kenton et al. | 395/186 |
| 5,500,940 | 3/1996 | Skeie | 395/183.01 |
| 5,513,105 | 4/1996 | Krowes | 340/825.34 |
| 5,530,431 | 6/1996 | Wingward | 340/568 |
| 5,596,317 | 1/1997 | Brinkmeyer et al. | 340/825.31 |
| 5,838,793 | 11/1998 | Lewis | 340/825.34 |

*Primary Examiner*—Salvatore Cangialosi
*Attorney, Agent, or Firm*—Allen, Dyer, Doppelt, Milbrath & Gilchrist, P.A.

[57] ABSTRACT

A system having enhanced security includes: a plurality of components; at least one security circuit associated with at least one component; and at least one master circuit associated with at least one component and connected in communication with the security circuit. More particularly, the security circuit when in the virgin state is switchable to a desired enrolled state for the master circuit. The master circuit according to one aspect of the invention preferably determines if the security circuit is in the virgin state and switches the security circuit to the desired enrolled state. The master circuit also preferably prevents operation of the system responsive to a security circuit being in an enrolled state other than the desired enrolled state for the master circuit. A security circuit may be restored to the virgin state in response to a user token or a fingerprint of the user. Method aspects of the invention are also disclosed.

65 Claims, 6 Drawing Sheets

SYSTEM INCLUDING SEPARABLE PROTECTED COMPONENTS AND ASSOCIATED METHODS

FIELD OF THE INVENTION

The present invention relates to the field of security, and more particularly, to a system including a plurality of separable components having enhanced security against theft.

BACKGROUND OF THE INVENTION

Vehicles, computers and other similar devices include a plurality of cooperating components. For example, an automobile includes body panels, an engine, various electronic modules, etc., that collectively define the automobile. Unfortunately these components may be stolen and resold individually for use in another vehicle. The entire vehicle may also be stolen, but the parts sold separately to avoid discovery. The value of the automobile components sold individually may be greater that the value of the assembled automobile. Similarly, a computer may have valuable components, such as a processor, plug-in memory module, display, etc. that may be stolen, while leaving the rest of the computer in place. Components that have a high value-to-weight or value-to-size ratio are common targets for thieves.

One approach for discouraging resale of component parts provides a unique marking on the component. For example, a serial number or other identification number may be permanently affixed to the component, such as an engine block or body panel. Unfortunately, such markings can be removed or the part sold to an unscrupulous buyer who has no concern for the authenticity of the component or the legal owner of the component. Irrespective of the markings on a conventional component, an automobile or computer, for example, will still function even with a stolen part or component installed therein.

Other approaches have been disclosed for discouraging the theft of components, or discouraging theft of the entire device where the stolen device is likely to be later sold as individual components. For example, U.S. Pat. No. 5,349,326 to Yamada discloses a car audio device including a main body and a front panel detachably mounted to the body. The car audio device will not operate unless a controller matches a code from the detachable panel to a code stored in memory in the main body portion. The secret code can be changed to any desired code by the owner via controls carried on the front panel. The secret code may also be generated and stored at the factory. Accordingly, the front panel and body portion may not be stolen and used separately.

Along these lines, U.S. Pat. No. 4,494,114 to Kaish discloses a lock-out security technique for microprocessor controlled electronic equipment. In particular, upon the occurrence of a disabling event, such as the removal of the equipment from its normal installation, and/or disconnecting of electrical power, the equipment will remain disabled until a code is manually entered via a keyboard. A publicly known code is installed at the factory and thereafter, the user installs his own private code. A secure factory initialization code may be used to allow for storage of the public code.

U.S. Pat. No. 5,229,648 to Sues et al. discloses a security system for a vehicle and includes a central processing unit that communicates with various components of the vehicle. If the codes returned from the components are incorrect, out of sequence, or missing, the processor will disable the components. An international database is used to approve any component changes within a vehicle. The database does not permit a part to be added to the active vehicle parts list unless a similar part is taken from a factory/dealer replacement parts list. Roadside service of a vehicle can be accommodated by using a portable computer and cellular telephone link to reprogram the processor to accept replacement parts. Encryption reduces the possibility of compromising the security of transmitted messages. Unfortunately, the tasks of maintaining such a comprehensive database and further ensuring its security may make this approach difficult to implement on a large scale.

U.S. Pat. No. 5,006,843 to Hauer discloses a security system for motor vehicles which includes an integrated circuit mounted inside vital accessories and which prevents these accessories from operating without the entry of a proper code by a user. In a maintenance state, a specific stored code word enables the starter permanently and no external code word is required for starting. This maintenance mode is used for delivery of a new vehicle, for service of the car and for replacement. The maintenance mode is ended by the user entering the code word of his choice.

Suggested improvements have been made in the area of security for devices and equipment such as vehicles and computers, which include cooperating components. Unfortunately, there may be substantial shortcomings associated even with these suggested improvements. For example, the management of a central database for all of the parts of all automobiles may be impractical. In addition, those systems requiring the user to remember a unique code or password for extended periods may also be impractical.

SUMMARY OF THE INVENTION

In view of the foregoing background, it is therefore an object of the present invention to provide a system and related method for a plurality of components having enhanced security without the necessity of an extensive centralized database, and without requiring the user to remember a code or password.

It is another object of the invention to provide a system and related methods wherein authorized or legitimate substitution and replacement of components is facilitated, and the complement of authorized or legitimate components may be readily changed.

These and other objects, features and advantages of the present invention are provided by a system comprising at least one security circuit associated with a respective at least one component; and at least one master circuit associated with a respective at least one component and connected in communication with the security circuit. More particularly, the master circuit, according to one aspect of the invention, preferably includes enrolling means for switching the security circuit to a desired enrolled state for the master circuit. The master circuit also preferably includes disabling means for preventing operation of at least a portion of the system responsive to a security circuit being in an enrolled state other than the desired enrolled state for the master circuit.

Another aspect of the invention is that the disabling means may preferably further comprise complement-based disabling means for disabling the system unless a predetermined complement of security circuits are in the desired enrolled state. In other words, in this embodiment of the invention, both the correct number of security circuits and the correct predetermined ones of the security circuits are preferably detected by the master circuit, or the system will not be permitted to operate.

The master circuit preferably further comprises complement adding means for permitting the adding of a new component and a new associated security circuit to the predetermined complement. The complement adding means preferably comprises virgin state responsive adding means for adding a new security circuit to the predetermined complement responsive to determining the new security circuit is in the virgin state. In somewhat different terms, authorized virgin components are readily added to the system to thereby facilitate expansion.

Accordingly, the system readily adapts to the addition or substitution of an authorized replacement component that is in the virgin state. No codes or passwords need be remembered by the user to return the system to operation. Moreover, the theft or unauthorized substitution of components is greatly discouraged, and security greatly enhanced.

The system preferably further includes communication link means for connecting the security circuit and master circuit in communication. Of course, the communication link means may link the security circuits of many components to a single or multiple master circuits. The communication link means may preferably comprise encryption means for encrypting signals exchanged between the security circuit and the master circuit. Accordingly, eavesdropping on the communication link is unlikely to compromise security. The communication link means may also preferably comprise asymmetric encryption means for asymmetrically encrypting signals exchanged between the security circuit and the master circuit to further discourage attempts to gain access to secure codes. The asymmetric encryption means may be provided by: public key means using a public key to encrypt signals exchanged between the security circuit and the master circuit; master circuit private key decrypting means connected to the master circuit for having a private key to decrypt the public key encrypted signals from the security circuit; and security circuit private key decrypting means connected to the security circuit having a private key to decrypt public key encrypted signals from the master circuit.

The communication link means preferably comprises means for establishing a digital data bus connecting the security circuit and the master circuit. The link may be wireless, such as radio or infrared, for example. Alternately, the communication link may be via a wireline, such as a fiber optic or electrical cable, for example.

A security circuit according to the invention is also desirably switchable from the desired enrolled state and back to the virgin state, that is, revirginized. In particular, the security circuit may be so switched responsive to a biometric characteristic of a user, such as a fingerprint of the user, for example. In an alternate embodiment, the revirginizing may be permitted based upon reading a user token, which the user may keep in a secure location for extended periods. The user is thus able to legitimately restore some or all of the components to the useful virgin state to be returned to the stream of commerce either as individual components or as a complete system.

The system according to the present invention may be advantageously applied to vehicles, for example. In this instance, the components are vehicle components, such as electronic components and/or body panels or other components. Another significant application of the present invention is the computer area. For example, the components may be one or more of the microprocessor, display, keyboard, memory, or disk drive. In addition, the system may be applied to appliances, such as in a home or commercial setting. The appliances may preferably be connected in communication via power line carrier technology using the power lines, for example.

A method aspect of the present invention is for enhancing security of a system comprising a plurality of components. The method preferably comprises the step of: associating a security circuit with a component; associating a master circuit with a component; switching the security circuit to a desired enrolled state responsive to the security circuit being in the virgin state; and disabling the system based on a security circuit being in an enrolled state other than the desired enrolled state for the master circuit. Other method aspects of the invention are directed to revirginizing the security circuits responsive to a biometric characteristic or user token, for example.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
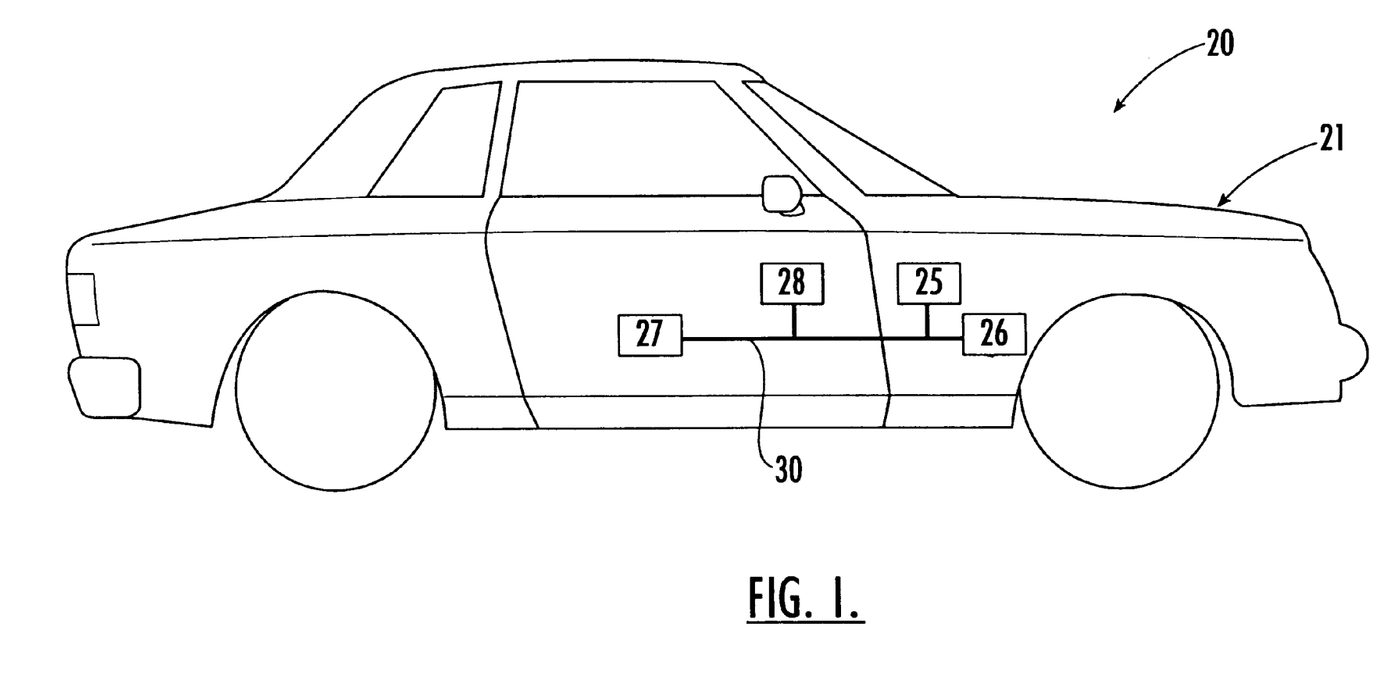
FIG. 1 is a schematic side view of the present invention incorporated into a vehicle.
Figure 2:
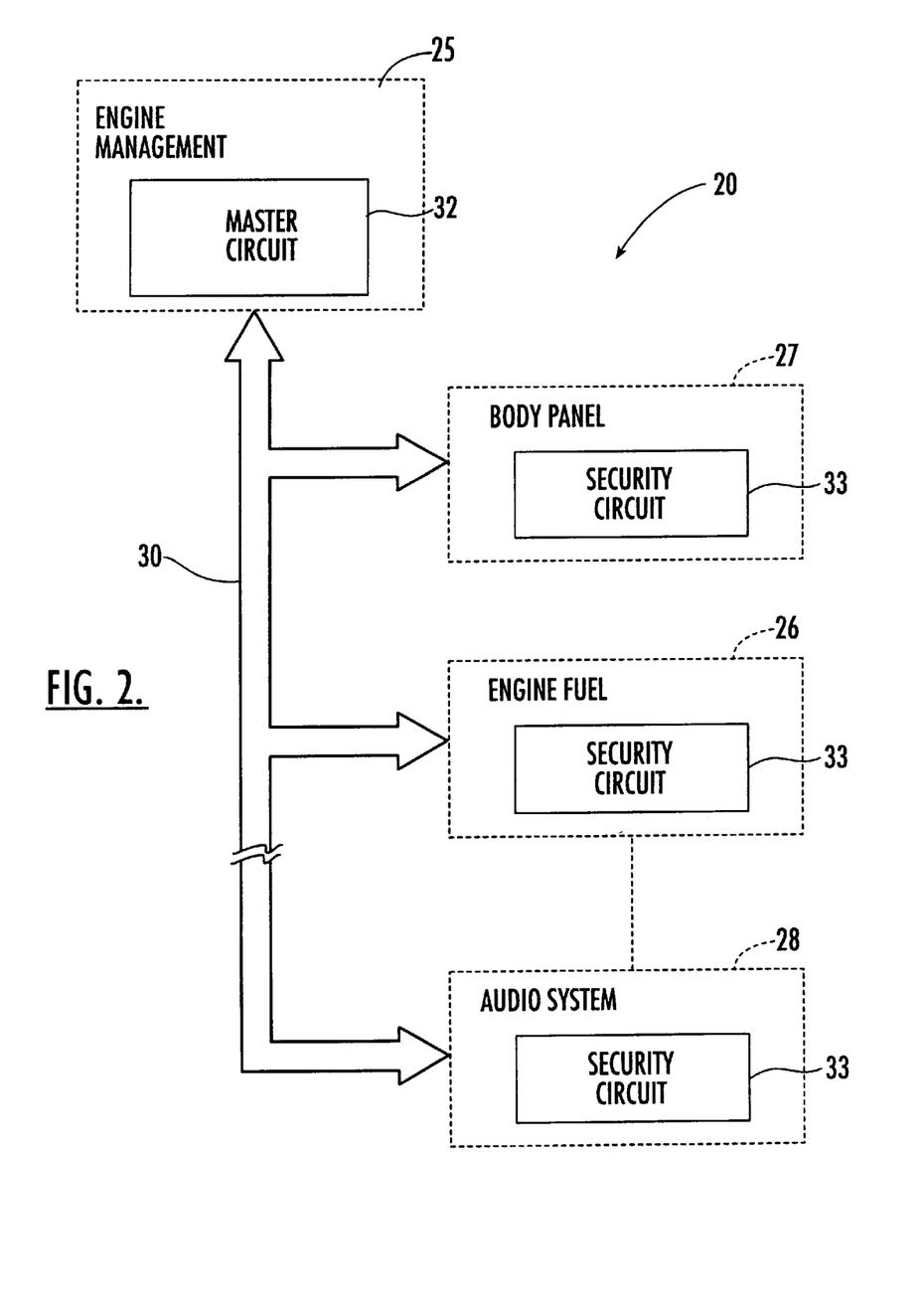
FIG. 2 is a schematic block diagram of the invention as shown in FIG. 1.

Referring initially to FIGS. 1 and 2 a first embodiment of an apparatus or system 20 in accordance with the invention is described. The system 20 is illustratively installed in an automobile 21, and those of skill in the art will appreciate that the system is especially advantageous for vehicles of all types to discourage theft of components. The system 20 includes a plurality of components and associated security circuits 33. By associated is meant that the security circuit is an integral part of the component or securely attached thereto, such that removal of the security circuit would damage the component and thereby significantly reduce its economic value. By associated is also meant that the security circuit may operatively effect whether the component is operable, particularly where the component is of an electronic or electrical nature, such as a circuit associated with the starter or alternator, for example.

The illustrated security circuits 33 are associated with a body panel 27, an engine fuel management control circuit 26, and an audio system control circuit 28. The security circuit 33 for the body panel 27 is an example of a passive component, that is, a component which does not otherwise require a communication connection to other components. In addition, the security circuit 33 for the body panel 27 may be adhesively secured or welded to the panel so that removal would damage the panel. The other security circuits 33 for the audio system 28 and the engine fuel management 26 may be incorporated with the electronics of these circuits.

The security circuits 33 are connected via a digital data bus 30 to the illustrated master circuit 32 which, in the illustrated embodiment, is associated with the engine management node controller 25. Those of skill in the art will also readily appreciate the continuing development of multiplexed wiring schemes for vehicles, such as the J1850 standard and others, which may readily provide the illustrated data bus 30. Moreover, the master circuit 32 may be associated with other components as would be readily understood by those skilled in the art. In addition, a typical vehicle 21 may include multiple master circuits 32 and the illustrated embodiment is simplified for clarity of explanation.

Again for clarity of explanation, the interaction and operation between a single master circuit 32 and a single security circuit 33 is now described in greater detail. The security circuit 33 has an enrolled state and a virgin state. The security circuit 33 when in the virgin state is switchable to an enrolled state, and when in an enrolled state is capable of generating a respective uniquely coded signal. The master circuit 32 according to one aspect of the invention preferably includes means for determining if the security circuit 33 is in the virgin state. If the security circuit 33 is in the virgin state, the master circuit 32 will cause the security circuit to switch to the desired enrolled state for the master circuit so as to be capable of generating a correctly coded signal for the master circuit.

The master circuit 32 also preferably includes disabling means for disabling at least one of the active components of the system or the entire system 30 responsive to the security circuit 33 being in an enrolled state other than the desired enrolled state for the master circuit 32. Accordingly, the system 30 readily adapts to the addition or substitution of an authorized replacement component that is in the virgin state. No complicated codes or passwords need to be remembered by the user to return the system to operation. A centralized database is also not needed. Moreover, the theft or substitution of components is greatly discouraged.

Figure 3:
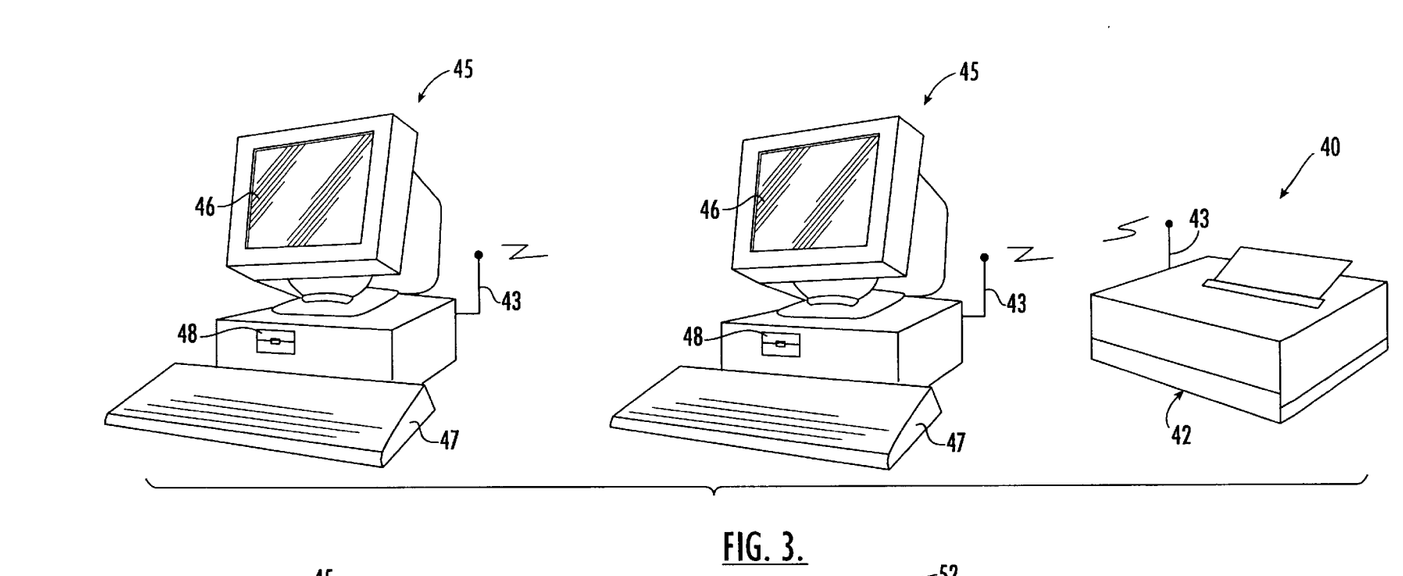
FIG. 3 is a schematic diagram of the present invention incorporated into a portion of a local area network of computers.
Figure 4:
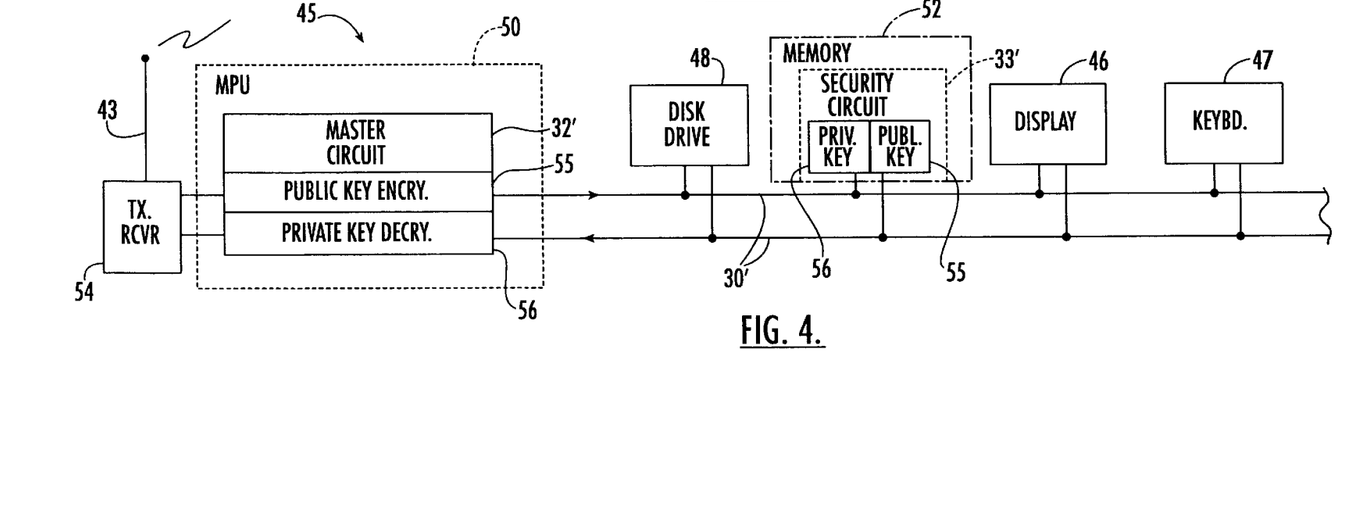
FIG. 4 is a schematic block diagram of the invention as shown in FIG. 3.

Referring now additionally to FIGS. 3 and 4, another implementation of the security system of the present invention is described as incorporated into a wireless local area network (LAN) 40, as well as the individual computers 45 of the LAN 40. The LAN 40 includes a plurality of personal computers 45 and the illustrated printer 42 connected by a wireless communications bus schematically illustrated by the antennas 43, the operation of which being readily understood by those skilled in the art.

A computer 45 includes a microprocessor 50 which incorporates the master circuit 32' connected in communication with additional internal components via an internal data bus 30'. A disk drive 48, memory 52, display 46 and keyboard 47 are shown connected to the master circuit 32'. Those of skill in the art will recognize not all of these components may require the security circuit, and that other components may also benefit from inclusion of a security circuit in accordance with the present invention.

The microprocessor 50 also communicates with the microprocessors of other computers via the illustrated transmitter and receiver 54 and antenna 43 as would be readily appreciated by those skilled in the art. Accordingly, the security of individual computers 45, printers 42 or other devices connected to the LAN have enhanced security in accordance with the invention. Those of skill in the art will also appreciate that the communication link may be provided by an infrared or other wireless communication channel, as well as by wireline connections including fiber optic connections, power line carrier, cables etc.

In the illustrated embodiment, the memory 52 is shown in greater detail to illustrate the security circuit 33'. Those of skill in the art will recognize that the other connected components preferably include a similar security circuit. The illustrated LAN 40 embodiment comprises encryption means for encrypting signals exchanged between the security circuit 33' and the controller circuit 32' of the microprocessor 50. Accordingly, eavesdropping on the communication link is unlikely to compromise security. The illustrated communication link comprises asymmetric encryption means for asymmetrically encrypting signals exchanged between the security circuit and the master circuit 32' to further discourage attempts to gain access to secure codes. The asymmetric encryption means may be provided in part by public key encrypting means 55 at both the master circuit 32' and the security circuit 33'. The public key encryption uses a public key to encrypt signals exchanged between the master circuit 32' and the security circuit 33'. Private key decrypting means 56 is provided at both the master circuit 32' and the security circuit 33' for decrypting the public key encrypted signals. Those of skill in the art will readily appreciate many schemes for the asymmetrical encryption, such as those provided by RSA Laboratories of Redwood City, Calif., for example.

Another aspect of the present invention is that the master circuits of a plurality of vehicles, for example, may be similarly coded so that security of components is provided within the fleet of vehicles. Accordingly, parts can be changed from one vehicle to another without triggering the disabling means. Similarly, the computers of a particular business may be similarly configured to permit swapping of computers between different work groups or to permit substitution of components from one computer to another. Those of skill in the art will appreciate other variations contemplated by the present invention.

Figure 5:
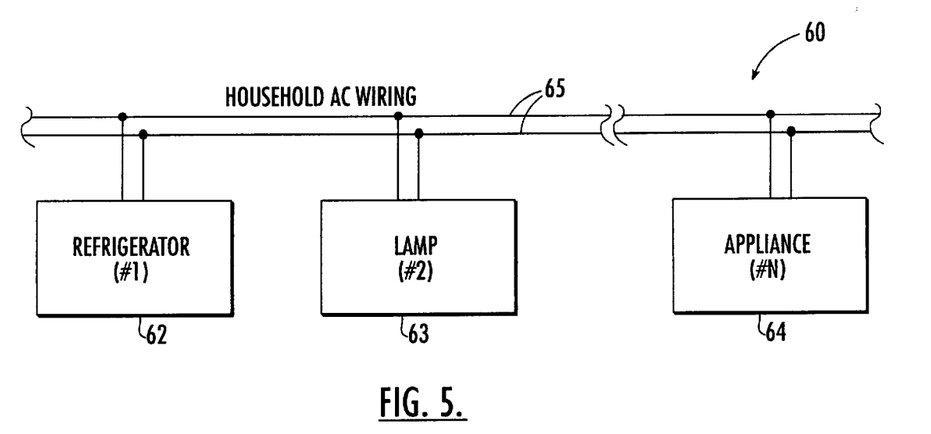
FIG. 5 is a schematic block diagram of the present invention communicating over household AC power wiring.

Turning now to FIG. 5, another system 60 incorporating the security technology of the present invention is illustrated. In this embodiment, a plurality of appliances including the illustrated refrigerator 62, lamp 63, and generic appliance 64 are connected via the schematically illustrated power lines 65. The refrigerator 62, for example, may include a master control circuit as described above, and the lamp 63 may include the security circuit, as also described above. A communication link may be provided by conventional power line carrier technology. Those of skill in the art will recognize other communication links and protocols that can be used to provide communication. For example, CEBus or X-10 technology may be employed to establish the communication link as would be readily understood by those skilled in the art. Accordingly, all or some of the appliances may be prevented from operating if an unauthorized appliance is connected. Similarly, a legitimate appliance including a security circuit in the virgin state can be readily added as would be appreciated by those skilled in the art.

The embodiment as shown in FIG. 5 is illustrative of the characteristic that the components of a system 60 in accordance with the invention may not necessarily be directly cooperating in a sense that they may, for example, be a collection of household appliances which only loosely cooperate in the sense that each must be present for any to operate. For example, a security system may be formed by the illustrated household appliances, each communicating with the others over household wiring or a radio link, such that unauthorized removal of one will render the others inoperable, and so that one removed will also be inoperable in another system.

Figure 6:
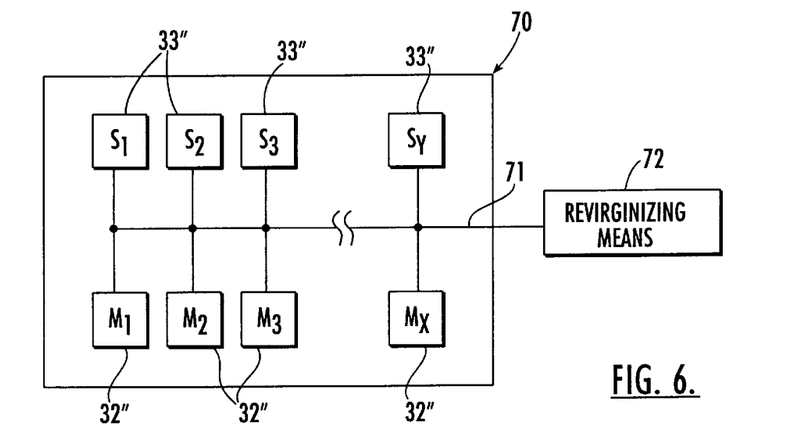
FIG. 6 is a schematic block diagram of yet another embodiment of the invention.

Another generic embodiment of a system 70 in accordance with the invention is understood with further reference to FIG. 6. The illustrated system 70 includes a plurality of security circuits $S_1$ to $S_y$ 33'' and a plurality of master circuits $M_1$ to $M_x$ 32'' connected in communication by the schematically illustrated link 71. A schematically illustrated revirginizing means 72 for the security circuits is also shown. As will be explained in greater below, the revirginizing means 72 permits the return of one or more security circuits to the virgin state.

Figure 7:
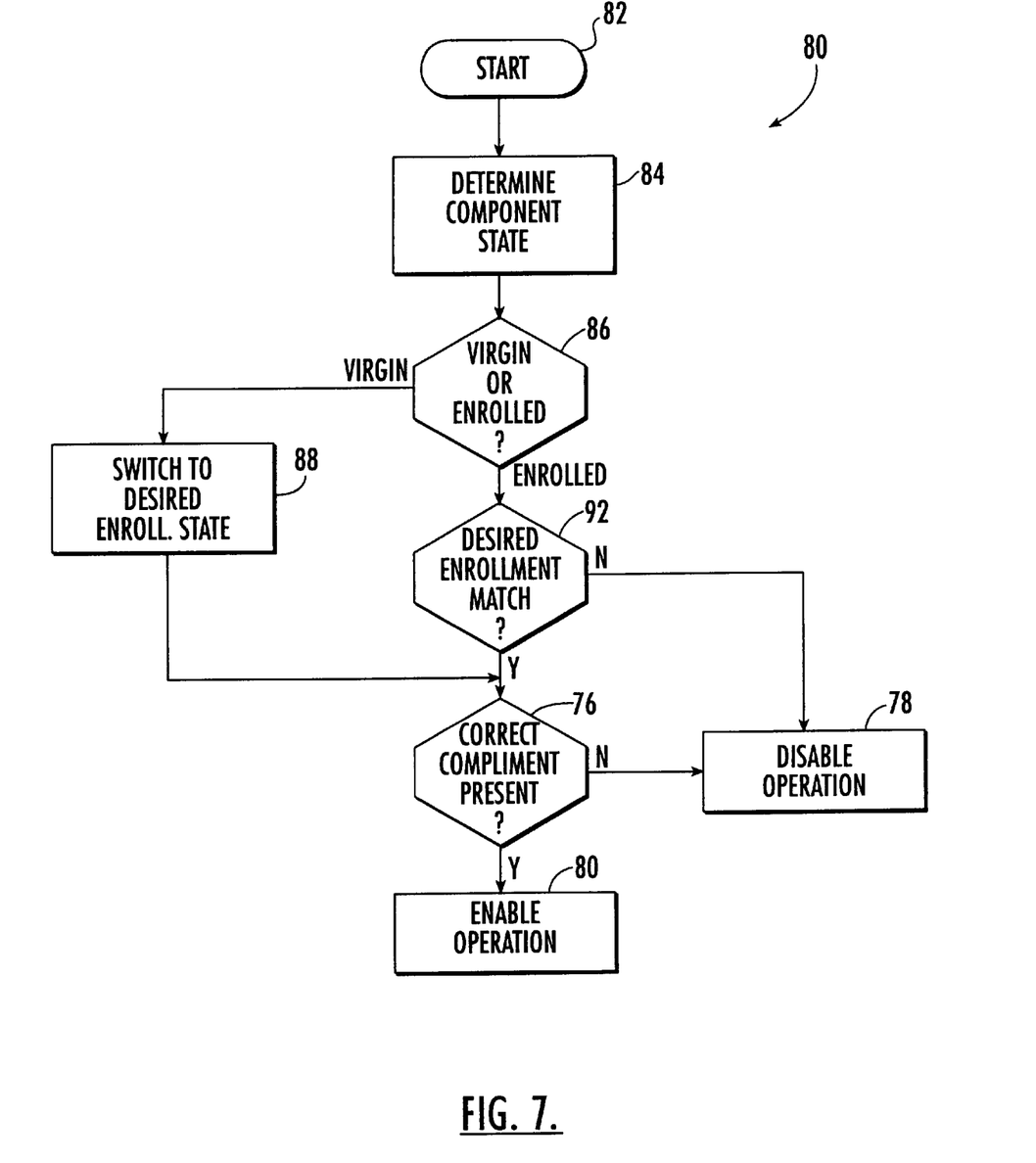
FIG. 7 is a flow chart of a method in accordance with the present invention.

Turning now additionally to the flow chart of FIG. 7, the above operation will be reviewed and yet other advantageous features of the invention explained. From the start (Block 82), the master circuit may poll the security circuit of a component and determine the state thereof at Blocks 84 and 86. The polling may be conducted on a timed basis, or based upon an event, such as start-up of the system. If the security circuit is in the enrolled state at Block 66, the enrolled state is checked at Block 92 to determine if the security circuit is in the desired enrolled state for the master circuit, that is, whether the security circuit is generating the correct coded signal for the master circuit. If not, the operation of the component or all of the components is disabled at Block 98. Accordingly, substitution of an unauthorized component is discouraged, and the commercial value of unauthorized components is thereby greatly reduced.

If at Block 86 it is determined that the security circuit of a component indicates that it is in the virgin state, the enrolling means of the master circuit switches the security circuit to the desired enrolled state for operation with the master circuit at Block 88. Accordingly, the master circuit can readily accommodate a legitimate replacement component.

Another aspect of the invention is that the disabling means of the controller circuit may preferably further comprise complement-based disabling means for disabling operation unless a predetermined complement of correct components and associated security circuits are connected in communication with the master circuit. In other words, the predetermined complement of components must be connected or operation of the system is prevented. Accordingly, at Block 76 a count of the number of correct security circuits is calculated and a table of the identity of the components may also be compared to a table of predetermined components to be sure that the complement is correct. At Block 76 it is determined whether the complement is correct, and if not, the operation is disabled (Block 78). If the complement is correct the operation is enabled at Block 80. Accordingly, the complement checking provides another level of security or theft deterrence.

To facilitate the addition of newly authorized components, such as for expansion, the master circuit preferably further comprises complement adding means for permitting the adding of a new component and a new associated security circuit to the predetermined complement. The complement adding means preferably comprises virgin state responsive adding means for adding a new component and associated new security circuit to the predetermined complement responsive to determining the new security circuit is in the virgin state.

Resetting the complement of components to a lesser number or changing the identities or make-up of the components of the complement may require a user to manually make such changes. Moreover, user authorization to do so may be enabled by the techniques described below for resetting one or more components to the virgin state.

Figure 8:
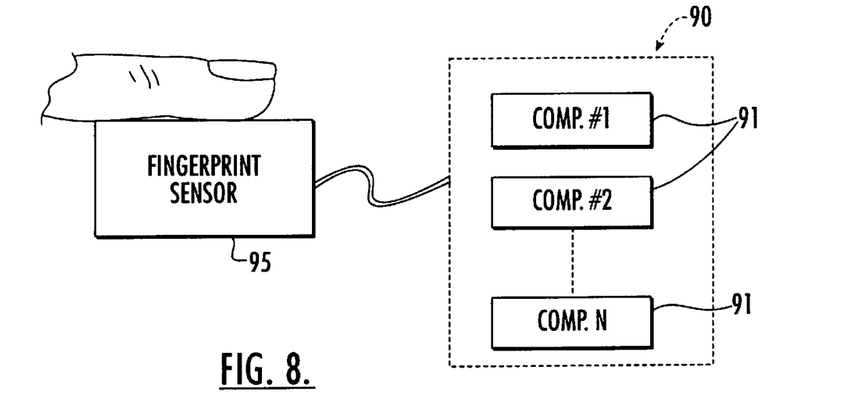
FIG. 8 is a schematic view of biometric sensing and revirginizing in accordance with the invention.
Figure 9:
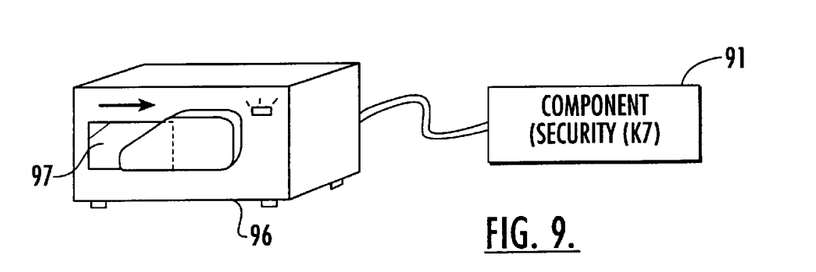
FIG. 9 is a schematic view of token reader sensing and revirginizing in accordance with the invention.
Figure 10:
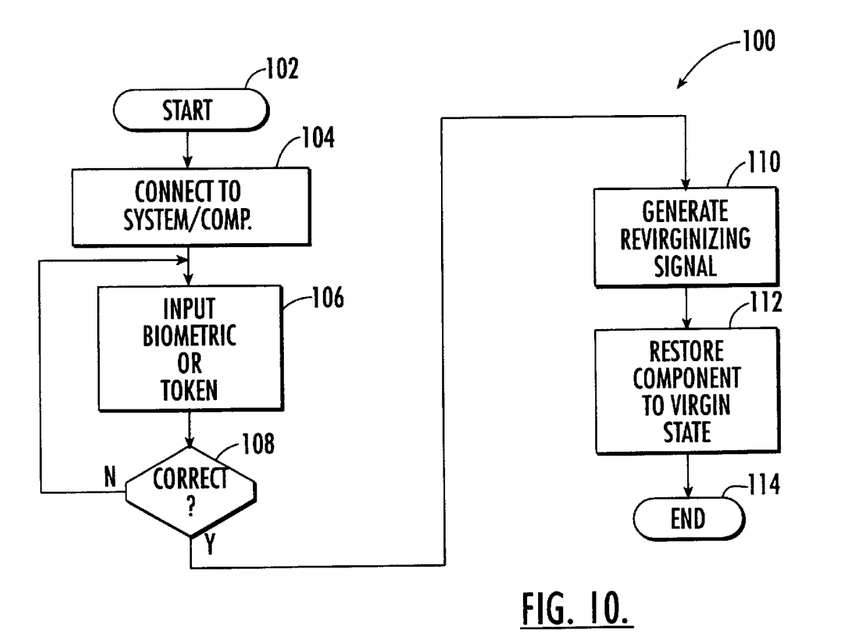
FIG. 10 is a flow chart of another method in accordance with the present invention.

Referring now to FIGS. 8–10, switching of a component or complete system back to the virgin state, that is, revirginizing the components or entire system is explained. The security circuits of one or more components may be switched to the virgin state responsive to a revirginizing signal from revirginizing means. In one particularly advantageous embodiment, the revirginizing means includes biometric sensing means for generating the revirginizing signal responsive to a biometric characteristic of a user. As shown in FIG. 8, a system 90 including a plurality of components 91 and their associated controller circuits and security circuits, may be reset to the virgin state by the illustrated fingerprint sensor 95. Other biometric characteristics may also be used as would be readily understood by those skilled in the art. However, fingerprint sensing may be particularly desirable because of the significant advances in relatively low cost integrated circuit sensors, such as those offered by the assignee of the present invention.

In an alternate embodiment as shown in FIG. 9, a token, such as the illustrated card 97, is advanced through the card reader 96 to generate the revirginizing signal to return the component 91 to the virgin state, and thus restore its value to be reused or resold as an individual part. The token may be a so-called smart card including data stored therein in magnetic or optical media or in an integrated circuit embedded in the card. By way of an additional example, the token may be a diskette or other data storage media adapted to be read by a computer. Other types of tokens that may be kept by the user for extended periods are also contemplated by the present invention.

As shown in the flow chart of FIG. 10, from the start (Block 102), the fingerprint sensor 95 or card reader 96 is connected to the components 91. An input signal from the biometric sensor or token reader at Block 106 is verified for correctness at Block 108. If correct, the revirginizing signal is generated at Block 110, the component is restored to the virgin state (Block 112), and the process ends (Block 114). The user is thus able to legitimately restore some or all of the components to the useful virgin state to be returned to the stream of commerce either as individual components or as a complete system. In addition, there need be no centralized database of codes which may present additional security risks, may decrease user flexibility, and may increase costs. The components may be readily manufactured in the virgin state.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A system having enhanced security and comprising:
 a plurality of components;
 at least one security circuit associated with a respective at least one component, said at least one security circuit being switchable from a virgin state to an enrolled state; and
 at least one master circuit associated with a respective at least one component and connected in communication with said at least one security circuit, said at least one master circuit comprising
  enrolling means for switching said at least one security circuit to a desired enrolled state only for the at least one master circuit responsive to the at least one security circuit being in the virgin state, and
  disabling means for disabling at least a portion of the system based upon at least one security circuit being in an enrolled state other than the desired enrolled state for the at least one master circuit;
 said at least one security circuit when in the virgin state being switchable to a respective desired enrolled state for a respective master circuit associated with any plurality of components to thereby facilitate legitimate substitution and replacement of components.

2. A system according to claim 1 wherein said disabling means further comprises complement-based disabling means for disabling at least a portion of the system unless a predetermined complement of one or more security circuits are in the desired enrolled state for the at least one master circuit.

3. A system according to claim 2 wherein said complement-based disabling means comprises means for disabling at least a portion of the system unless a predetermined number of security circuits are in the desired enrolled state for the at least one master circuit.

4. A system according to claim 2 wherein said complement-based disabling means comprises means for disabling at least a portion of the system unless predetermined security circuits are in the desired enrolled state for the at least one master circuit.

5. A system according to claim 2 wherein said at least one master circuit further comprises complement adding means for adding a new security circuit to the predetermined complement.

6. A system according to claim 5 wherein said complement adding means comprises virgin state responsive adding means for adding the new security circuit to the predetermined complement responsive to determining the new security circuit is in the virgin state.

7. A system according to claim 1 further comprising communication link means connecting said at least one master circuit in communication with said at least one security circuit.

8. A system according to claim 7 wherein said communication link means comprises encryption means for encrypting signals exchanged between said at least one security circuit and said at least one master circuit.

9. A system according to claim 8 wherein said encryption means comprises asymmetric encryption means for asymmetrically encrypting signals exchanged between said at least one security circuit and said at least one master circuit.

10. A system according to claim 9 wherein said asymmetric encryption means comprises:
 public key means for encrypting signals exchanged between said at least one security circuit and said at least one master circuit using a public key;
 master circuit private key decrypting means connected to said at least one master circuit for decrypting public key encrypted signals from said at least one security circuit using a private key; and
 security circuit private key decrypting means connected to said at least one security circuit for decrypting public key encrypted signals from said at least one master circuit using a private key.

11. A system according to claim 7 wherein said communication link means comprises means for establishing a digital data bus.

12. A system according to claim 7 wherein said communication link means comprises means for establishing a wireless channel.

13. A system according to claim 7 wherein said communication link means comprises means for establishing a wireline channel.

14. A system according to 1 further comprising revirginizing means for switching at least one security circuit back to the virgin state after being in the desired enrolled state.

15. A system according to claim 1 further comprising biometric sensing and revirginizing means for switching at least one security circuit back to the virgin state after being in the desired enrolled state and based upon a biometric characteristic of a user.

16. A system according to claim 15 wherein said biometric sensing and revirginizing means comprises a fingerprint sensor.

17. A system according to claim 1 further comprising token reading and revirginizing means for switching at least one security circuit back to the virgin state after being in the desired enrolled state and based upon reading a user token.

18. A system according to claim 1 wherein said plurality of components comprise a plurality of vehicle components.

19. A system according to claim 18 wherein said plurality of vehicle components comprise:
 at least one electronic component; and
 at least one vehicle body component.

20. A system according to claim 1 wherein said plurality of components comprise a plurality of computer components.

21. A system according to claim 20 wherein said plurality of computer components comprise:
 a microprocessor; and
 at least one of a display, keyboard, memory, and disk drive.

22. A system according to claim 1 wherein said plurality of components comprise a plurality of appliances.

23. A system according to claim 22 further comprising power line carrier communication means for establishing a communication link between the plurality of appliances over power wiring.

24. A security apparatus for a system comprising a plurality of components, the security apparatus comprising:
 at least one security circuit associated with a respective at least one component, said at least one security circuit being switchable from a virgin state to an enrolled state;
 at least one master circuit associated with a respective at least one component and connected in communication with said at least one security circuit, said at least one master circuit comprising disabling means for disabling at least a portion of the system based upon at least one security circuit being in an enrolled state other than a desired enrolled state for the at least one master circuit;
 said at least one security circuit when in the virgin state being switchable to a respective desired enrolled state for a respective master circuit associated with any plurality of components to thereby facilitate legitimate substitution and replacement of components; and biometric sensing and revirginizing means for switching at least one security circuit back to the virgin state after being in the desired enrolled state and based upon a biometric characteristic of a user.

25. A security apparatus according to claim 24 wherein said biometric sensing and revirginizing means comprises a fingerprint sensor.

26. A security apparatus according to claim 24 wherein said at least one master circuit further comprises enrolling means for switching said at least one security circuit to the desired enrolled state for the at least one master circuit responsive to the at least one security circuit being in the virgin state.

27. A security apparatus according to claim 24 wherein said disabling means further comprises complement-based disabling means for disabling at least a portion of the system unless a predetermined complement of one or more security circuits are in the desired enrolled state for the at least one master circuit.

28. A security apparatus according to claim 27 wherein said complement-based disabling means comprises means for disabling at least a portion of the system unless a predetermined number of security circuits are in the desired enrolled state for the at least one master circuit.

29. A security apparatus according to claim 27 wherein said complement-based disabling means comprises means for disabling at least a portion of the system unless predetermined security circuits are in the desired enrolled state for the at least one master circuit.

30. A security apparatus according to claim 24 further comprising communication link means connecting said at least one master circuit in communication with said at least one security circuit.

31. A security apparatus according to claim 30 wherein said communication link means comprises asymmetric encryption means for asymmetrically encrypting signals exchanged between said at least one security circuit and said at least one master circuit.

32. A security apparatus for a system comprising a plurality of components, the security apparatus comprising:

at least one security circuit associated with a respective at least one component, said at least one security circuit being switchable from a virgin state to an enrolled state;

at least one master circuit associated with a respective at least one component and connected in communication with said at least one security circuit, said at least master circuit comprising disabling means for disabling at least a portion of the system based upon at least one security circuit being in an enrolled state other than a desired enrolled state for the at least one master circuit;

said at least one security circuit when in the virgin state being switchable to a respective desired enrolled state for a respective master circuit associated with any plurality of components to thereby facilitate legitimate substitution and replacement of components; and token reader and revirginizing means for switching at least one security circuit back to the virgin state after being in the desired enrolled state and based upon reading a user token.

33. A security apparatus according to claim 32 wherein said at least one master circuit further comprises enrolling means for switching said at least one security circuit to the desired enrolled state for the at least one master circuit responsive to the at least one security circuit being in the virgin state.

34. A security apparatus according to claim 32 wherein said disabling means further comprises complement-based disabling means for disabling at least a portion of the system unless a predetermined complement of one or more security circuits are in the desired enrolled state for the at least one master circuit.

35. A security apparatus according to claim 34 wherein said complement-based disabling means comprises means for disabling at least a portion of the system unless a predetermined number of security circuits are in the desired enrolled state for the at least one master circuit.

36. A security apparatus according to claim 34 wherein said complement-based disabling means comprises means for disabling at least a portion of the system unless predetermined security circuits are in the desired enrolled state for the at least one master circuit.

37. A security apparatus according to claim 32 further comprising communication link means connecting said at least one master circuit in communication with said at least one security circuit.

38. A security apparatus according to claim 37 wherein said communication link means comprises asymmetric encryption means for asymmetrically encrypting signals exchanged between said at least one security circuit and said at least one master circuit.

39. A method for enhancing security of a system comprising a plurality of components, the method comprising the steps of:

associating at least one security circuit with a respective at least one component, said at least one security circuit being switchable from a virgin state to an enrolled state;

associating at least one master circuit with a respective at least one component;

switching said at least one security circuit to a desired enrolled state for the at least one master circuit responsive to the at least one security circuit being in the virgin state, the at least one security circuit when in the virgin state being switchable to a respective desired enrolled state for a respective master circuit associated with any plurality of components to thereby facilitate legitimate substitution and replacement of components; and disabling at least a portion of the system based upon at least one security circuit being in an enrolled state other than the desired enrolled state for the at least one master circuit.

40. A method according to claim 39 further comprising the step of disabling at least a portion of the system unless a predetermined complement of one or more security circuits are in the desired enrolled state for the at least one master circuit.

41. A method according to claim 40 further comprising the step of adding a new security circuit to the predetermined complement responsive to determining the new security circuit is in the virgin state.

42. A method according to claim 39 further comprising the step of encrypting signals exchanged between said at least one security circuit and said at least one master circuit.

43. A method according to claim 39 further comprising the step of asymmetrically encrypting signals exchanged between said at least one security circuit and said at least one master circuit.

44. A method according to claim 39 wherein the plurality of components comprise vehicle components; and wherein the steps of associating the at least one security circuit and the at least one master circuit comprise associating same with respective vehicle components.

45. A method according to claim 39 wherein the plurality of components comprise computer components; and wherein the steps of associating the at least one security circuit and the at least one master circuit comprise associating same with respective computer components.

46. A method according to claim 39 wherein the plurality of components comprise appliances; and wherein the steps of associating the at least one security circuit and the at least one master circuit comprise associating same with respective appliances.

47. A method for enhancing security of a system comprising a plurality of components, the method comprising the steps of:

associating at least one security circuit with a respective at least one component, said at least one security circuit being switchable from a virgin state to an enrolled state;

associating at least one master circuit with a respective at least one component;

switching said at least one security circuit to a desired enrolled state for the at least one master circuit, the at least one security circuit when in the virgin state being switchable to a respective desired enrolled state for a respective master circuit associated with any plurality of components to thereby facilitate legitimate substitution and replacement of components;

disabling at least a portion of the system based upon at least one security circuit being in an enrolled state other than a desired enrolled state for the at least one master circuit; and switching at least one security circuit back to the virgin state after being in the desired enrolled state based upon sensing a biometric characteristic of a user.

48. A method according to claim 47 wherein the sensed biometric characteristic of the user is a fingerprint.

49. A method according to claim 47 wherein the step of switching said at least one security circuit to the desired enrolled state comprises switching same responsive to the at least one security circuit being in the virgin state.

50. A method according to claim 47 further comprising the step of disabling at least a portion of the system unless a predetermined complement of one or more security circuits are in the desired enrolled state for the at least one master circuit.

51. A method according to claim 50 further comprising the step of adding a new security circuit to the predetermined complement responsive to determining the new security circuit is in the virgin state.

52. A method according to claim 47 further comprising the step of encrypting signals exchanged between said at least one security circuit and said at least one master circuit.

53. A method according to claim 47 further comprising the step of asymmetrically encrypting signals exchanged between said at least one security circuit and said at least one master circuit.

54. A method according to claim 49 wherein the plurality of components comprise vehicle components; and wherein the steps of associating the at least one security circuit and the at least one master circuit comprise associating same with respective vehicle components.

55. A method according to claim 47 wherein the plurality of components comprise computer components; and wherein the steps of associating the at least one security circuit and the at least one master circuit comprise associating same with respective computer components.

56. A method according to claim 47 wherein the plurality of components comprise appliances; and wherein the steps of associating the at least one security circuit and the at least one master circuit comprise associating same with respective appliances.

57. A method for enhancing security of a system comprising a plurality of components, the method comprising the steps of:

associating at least one security circuit with a respective at least one component, said at least one security circuit being switchable from a virgin state to an enrolled state;

associating at least one master circuit with a respective at least one component;

switching said at least one security circuit to a desired enrolled state for the at least one master circuit, the at least one security circuit when in the virgin state being switchable to a respective desired enrolled state for a respective master circuit associated with any plurality of components to thereby facilitate legitimate substitution and replacement of components;

disabling at least a portion of the system based upon at least one security circuit being in an enrolled state other than a desired enrolled state for the at least one master circuit; and switching at least one security circuit back to the virgin state after being in the desired enrolled state based upon reading a user token.

58. A method according to claim 57 wherein the step of switching said at least one security circuit to the desired enrolled state comprises switching same responsive to the at least one security circuit being in the virgin state.

59. A method according to claim 57 further comprising the step of disabling at least a portion of the system unless a predetermined complement of one or more security circuits are in the desired enrolled state for the at least one master circuit.

60. A method according to claim 59 further comprising the step of adding a new security circuit to the predetermined complement responsive to determining the new security circuit is in the virgin state.

61. A method according to claim 57 further comprising the step of encrypting signals exchanged between said at least one security circuit and said at least one master circuit.

62. A method according to claim 57 further comprising the step of asymmetrically encrypting signals exchanged between said at least one security circuit and said at least one master circuit.

63. A method according to claim 57 wherein the plurality of components comprise vehicle components; and wherein the steps of associating the at least one security circuit and the at least one master circuit comprise associating same with respective vehicle components.

64. A method according to claim 57 wherein the plurality of components comprise computer components; and wherein the steps of associating the at least one security circuit and the at least one master circuit comprise associating same with respective computer components.

65. A method according to claim 57 wherein the plurality of components comprise appliances; and wherein the steps of associating the at least one security circuit and the at least one master circuit comprise associating same with respective appliances.

* * * * *